United States Patent Office 3,429,723
Patented Feb. 25, 1969

3,429,723
PROCESS FOR THE MANUFACTURE OF REFRACTORY MAGNESIA-CHROME AND CHROME-MAGNESIA PRODUCTS
Kurt Maria Maier and Viktor Mayer, Radenthein, Gunther Lorenz Mortl, Villach, and Norbert Franz Skalla, Radenthein, Austria, assignors to Osterreichisch-Amerikanische Magnesit Aktiengesellschaft, Carinthia, Austria, a corporation of Austria
No Drawing. Continuation-in-part of application Ser. No. 540,825, Apr. 7, 1966, which is a continuation-in-part of application Ser. No. 449,646, Apr. 20, 1965. This application Aug. 29, 1967, Ser. No. 663,983
Claims priority, application Austria, Apr. 22, 1964, A 3,520/64; Apr. 13, 1965, A 3,510/65
U.S. Cl. 106—59                                    24 Claims
Int. Cl. C04b 35/12

ABSTRACT OF THE DISCLOSURE

A shaped mixture of a source of chromium oxide and natural magnesite having an MgO content no more than 92%, said mixture having specified particle size and chemical composition characteristics is sintered without fusion at a temperature of at least 1700° C., the sintered material is granulated and the granulated material is used to make burned or unburned bricks.

---

This application is a continuation-in-part of application Ser. No. 540,825, filed Apr. 7, 1966, now abandoned which application Ser. No. 540,825 is a continuation-in-part of application Ser. No. 449,646, filed Apr. 20, 1965, now abandoned. The present invention relates to the manufacture of refractory magnesia-chrome and chrome-magnesia bricks or refractory compositions that can be used in the unburnt (unfired) or in the burnt (fired) state. In the latter case, the bricks are burnt at a temperature ranging from 1500 to 1600° C. and are at least equivalent to magnesia-chrome and chrome-magnesia bricks burnt at a high temperature, that is to say at a temperature in excess of 1700° C. In the case of unburnt bricks prepared according to the present invention, they are at least equivalent to magnesia-chrome and chrome-magnesia bricks that have been fired at a high temperature, say in excess of 1700° C.

It is another object of this invention to provide magnesia-chrome and chrome magnesia products whose refractoriness-under-load, cold crushing strength, flexural strength, abrasion resistance, resistance to corrosive attacks of slags and further properties, especially hot modulus of rupture, make them particularly suitable for use in the construction of industrial furnaces, especially the building of walls and roofs of open-hearth furnaces and other metallurgical furnaces.

It is a further specific object of this invention to provide refractory compositions or masses that are based on magnesia-chrome and chrome-magnesia and are characterized by a high refractoriness, refractoriness under load, cold crushing strength, abrasion resistance and resistance to slag attack and which may be used in industrial furnaces and metallurgical vessels in an unshaped condition, as mortar, patching and spraying compositions, or in a shaped condition, as in tamping mixtures.

It is already known that magnesia-chrome and chrome-magnesia bricks having valuable properties can be obtained if the bricks are fired at a temperature above 1700° C. before they are used. Such firing process involves technological difficulties. In plants in which bricks are fired at conventional temperatures, the incorporation of high-temperature firing into the manufacturing program involves large investments because high-temperature firing requires special precautions in order to prevent a squeezing of the bricks and to ensure that they will at least approximately retain their dimensions and shape.

This invention is based on the finding that the foregoing objects can be achieved by starting from a sintered product obtained by simultaneously burning the substance containing chromium oxide and natural magnesite used as starting materials for the manufacture of the bricks at a minimum temperature, while observing certain requirements concerning the composition of the mixture to be sintered. Starting from this finding, the invention provides a process for the manufacture of refractory magnesia-chrome and chrome-magnesia products in which substances containing chromium oxide, especially chrome ore (chromite), have been mixed with magnesite, if desired sintered magnesite, and, advantageously after having shaped the mix, as in briquette form, it is sintered without fusion at a minimum temperature of 1700° C., preferably at least 1750° C., whereupon the sintered material is granulated and, if desired with the addition of sintered magnesia, used as refractory material in applications of the type referred to, this process being characterized by a combination of the following further features:

(a) The sintered material contains no more than 5.5% and preferably no more than 4.5% of silica and (b) The sintered material has a lime:silica ratio not exceeding 0.6 and preferably not exceeding 0.35.

The resulting sintered material has the properties of a material which has been fired at high temperatures, namely, a direct bond between the substance which contains chromium oxide and the magnesia. This direct bond is also retained during the further processing of the sintered material and in bricks made therefrom. Without a high-temperature firing of the bricks with its attendant disadvantages, this process results in bricks or other refractory products which are at least equivalent to bricks that have been fired at high temperatures.

Refractories from magnesia-chrome and chrome-magnesia burnt at high temperatures, i.e., above 1700° C., possess outstanding properties and are definitely superior to known refractories of identical composition that have been burnt at lower temperatures. This is probably due to the fact that the burning at high temperatures causes an intimate bond between chrome ore and periclase so that a sort of unitary ceramic material is formed in which the periclase particles are uniformly superimposed on the chrome ore particle so that the periclas and chrome ore particles are always joined together over a larger area or are, as it were, welded together, and are not separated even during grinding; in fact, even during the grinding or crushing of such burnt products the break does not occur between the chrome ore and periclase but, away from the areas of contact of these two substances, right through the burnt particle. This is not the case with the hitherto known refractories from magnesia-chrome and chrome-magnesia which have been burnt at a lower temperature. In these refractories, the periclase particles are bonded with the chrome ore particle practically only at individual points of contact so that these bonds are much less firm than is the case with the refractories burnt at high temperatures, and when a break occurs it takes place between the chrome ore particles and the periclase particles in contact with them. Advantageous as the properties of magnesia-chrome and chrome-magnesia refractories burnt at high temperatures may be, it must still be borne in mind that burning at high temperatures involves considerable technical difficulties. Such burning requires a special type of chamber furnace because refractories to be burnt at high temperatures cannot be burnt together with other refractories since the latter would be excessively compressed and moreover because the setting of the bricks requires special, time-consuming measures. It is therefore of great advantage if it is possible to manufacture refractories that have not been burnt at a high temperature and yet possess the same properties as those so burnt.

One step according to the invention to achieve this aim is to use very high temperatures, namely a minimum temperature of 1700° C., and preferably at least 1750° C., for making the sintered material from the starting materials. However high the temperature used in sintering, no difficulties arise. Particularly favorable results are obtained when the material to be sintered is sintered in shaped form, especially in the form of briquettes or bricks. In this case, the strength properties and the porosity of the refractories obtained from the sintered material are substantially better than when the material to be sintered is used, for example, in form of granules.

The formation of the stated direct bond and a major part of the desirable properties of unfired bricks and compositions or masses produced from the sintered material of the present invention depend less on the particle sizes of the materials to be sintered than on the lime-silica ratio and the silica content. In the production of the sintered material, it will be preferable, however, if the magnesite is used in particle sizes of 0–0.2 mm. when the mixture to be sintered is shaped into briquettes, and in particle sizes of 0–5 mm., preferably 0–3 mm., when the mixture to be sintered is shaped into bricks. In these cases, the magnesite component comprises particles larger than 0.12 mm. However, according to another embodiment of the invention it is possible to use a magnesite in which substantially all of the particles are less than 0.12 mm., even less than 0.10 mm., especially when the sintered material is to be molded into bricks which are to be fired.

The source of oxide in accordance with the present invention is crude (raw) natural magnesite, including crude flotation magnesite, having an MgO content of no more than 92%. The raw natural magnesite generally has an MgO content of at least about 83%, such as from about 83 to about 89%, and the flotation magnesite has a somewhat higher MgO content up to 92%, such as 91–92%. These figures are based on an oxide analysis of dead burned material. The raw magnesite starting material is, of course, in carbonate form. Sintered magnesite, having the stated MgO content, may also be subjected to the cofiring operation, although this practice is uneconomical as two firing operations are required. It will be particularly suitable to produce relatively large shaped bodies from the materials to be sintered if the magnesite is available only in relatively large particle sizes, as may be the case particularly with sintered magnesite or with a magnesite which has been beneficiated by a process other than flotation. If the starting materials are available in small particle sizes, they may be shaped also into granules. The use of larger shaped bodies, such as briquettes or bricks, however, results in better properties, such as porosity and raw density, of the products made from the sintered material.

In the production of the sintered material, it is desirable that at least 65% and preferably at least 80% of the substances which contain chromium oxide, should have a particle size over 0.12 mm. The optimum particle size range for this material is 0–6 mm., preferably 0–4 mm.

The composition of the materials to be used for the simultaneous burning is selected, according to further features of this invention, so that the sintered material has a silica content not exceeding 5.5%, preferably not exceeding 4.5%, and a lime:silica molecular ratio not exceeding 0.6, preferably not exceeding 0.35. At this lime:silica ratio, the silica is in the form of forsterite, and there are no disturbing amounts of low-melting monticellite present. In the most advantageous case, the silica content of the sintered material is below 4.0% or better still below 3.5%. The aforementioned maximum content of 5.5% in the sintered material prevents the particles containing chromium oxide, especially chromite particles, being enveloped with silicates so that, at the burning temperature used of at least 1700° C., the obtaining of a direct bond between the particles containing chromium oxide and the periclase particles is insured.

In the process of the invention, the sintered material should be prepared from a source of chromium oxide having a silica content from 3 to 7%, preferably from 3.5 to 5%; and the magnesite should have a lime content such that the sintered material has a lime content from 0.5 to 2.5%, preferably from 0.8 to 1.5%. Both the substance containing chromium oxide and the magnesite should be used in such proportions that the sintered material contains 5 to 40%, preferably 10–20 to 30% of $Cr_2O_3$.

The resulting sintered material may be used as it is or after having been admixed with sintered magnesite for the usual manufacture of refractories. No chromite is added to the sintered material because this would lead to the recurrence of the so-called aging effect of chrome ore inside the bricks, that is to say a loosening up of the structure by oxidation of ferrous oxide to ferric oxide; this effect has been eliminated in the sintered material by making it by simultaneous sintering the two above mentioned substances. If the sintered material by itself is used for the manufacture of refractories, it is advantageous to use 60 to 80% of it in a coarsely granular (over 0.12 mm.) and 40 to 20% in a finely granular form (from 0 to 0.12 mm.) of which latter preferably at most 60% should be smaller than 0.06 mm. When sintered magnesite is added to the sintered material it is used in an amount of up to 75%, preferably of under 40%, and in a coarsely granular form, no more than 10% of this sintered magnesite having a particle size below 0.12 mm. Any sintered magnesite added should likewise contain only 0.5 to 2.5%, preferably 0.8 to 1.5%, of lime, or it should have a composition such that the refractories do not contain more than 5.5% of $SiO_2$.

In one important embodiment of the invention, the grained sintered material (co-sintered material), sintered at a temperature of at least 1750° C., is used in the production of the unfired bricks and masses or compositions with an admixture of at most 35% sintered magnesia, based on the refractory components. However, in this embodiment the amount of sintered magnesia which may be added in fine-grained form in a particle size of at most 0.12 mm. to the grained sintered material, will not exceed 8% and is preferably only 3–5%, based on the refractory components. This means that the material which may be added to the sintered material includes at most 8% sintered magnesia having a particle size up to 0.12 mm. and up to 27% sintered magnesia having a particle size over 0.12 mm. The particle size of the coarse-grained sintered magnesia should preferably exceed 0.5 mm.

It has also been found that when unburnt bricks are produced from the sintered and grained material, according to the stated embodiment, and this sintered material contains at least 13% of $Cr_2O_3$, it is essential to add fine-grained magnesia having a particle size of at most 0.12 mm. in an amount of up to 8%, preferably 3–5%, based on the refractory components, to insure the desired high cold crushing strength.

In addition to the above-mentioned refractory components, the unfired refractory products prepared according to the stated embodiment of the invention contain generally only an admixture of a binder such as sulfite cellulose waste liquor or magnesium sulfate, and are dried at temperatures from about 110 to about 180° C. preferably from about 130 to about 150° C.

The refractories of the invention contain at least 30% of magnesia and no more than 70%, preferably no more than 60%, of chrome ore or substances containing chromium oxide. They may be used in the burnt or unburnt state; in the former case, the bricks are dried at temperatures below 100° C., usually 70–80° C., and burnt at the usual temperature of about 1500° C. or over. Higher burning temperatures, e.g. 1700° C., do not significantly improve the properties of the bricks and are therefore of no practical use.

In the finished product as in the sintered material, the lime-silica ratio should desirably not exceed 0.6 and the silica content should desirably be less than 5.5%.

It may be mentioned that some of the features of the process of this invention are already known, and in this respect the following may be said:

In a known process for the manufacture of chrome-magnesia refractories, ground chrome ore is first mixed with a finely dispersed magnesium compound that on burning furnishes magnesia, such as brucite, magnesite, caustic magnesia or other natural or synthetic magnesium compounds, the mix is moulded in briquette form and these briquettes are sintered at a temperature ranging from 1650 to 1930° C. The sintered material obtained in this manner is partially granulated, partially finely ground, and a mixture of specified proportions of the coarse and the fine particles is formed into bricks which are then burnt (U.S. Patent 2,060,697). In this process, a chrome ore is used which contains 9.5 to 10.0% of silica in admixture with an amount of magnesium compound such that the MgO obtained by burning suffices to convert at least a substantial portion of the low-melting gang of the chrome ore into forsterite, without however decomposing the chromite spinel of the chrome ore. As such amounts of magnesium compounds there are suitable quantites that produce an MgO content in the mixture of at least 11.5% to 25%. That is to say that, taking into consideration the aforementioned silica content of the chrome ore of 9.5% to 10.0% in the sintered material, even an addition of, for example, 25% of silica-free magnesite still ensures a silica content of over 7%.

According to a variant of the aforementioned process, the magnesium compounds mentioned above are replaced by a periclase material, that is to say a previously burnt material containing magnesia (U.S. Patents 2,028,018 and 2,037,600 and German Patent 676,006).

Another known process for the manufacture of granular sintered material from magnesia or magnesite, which does not sinter at the conventional burning temperatures, performed in the presence of chrome ore consists substantially in mixing the finely divided magnesia or magnesite with about 15 to 50% of chrome ore, calculated from the weight of the whole mixture, the silica content of the mixture, referred to its calcined state, being adjusted to 3 to 10%, the FeO content to less than 12% and the lime content to less than 3%, and this mixture in the granular form is sintered in an oxidizing fire (German Patent 750,654). Further suitable starting materials are caustically burnt magnesite or calcined synthetic magnesia and the chrome ore in the mixture may be replaced wholly or partially by other natural or synthetic substances rich in chromium spinel, e.g. slags. The burning is to be performed at temperatures of 1600° C. or over. It is a prerequisite for this process that the starting materials are finely divided; a particle size of 0.2 mm. is considered adequate and in certain cases, when only a partial conversion is desired, one or the other component may be somewhat coarser. This patent does not teach that it is necessary for the manufacture of refractories from mixtures of substances that furnish magnesia and substances that contain chromium oxide to use for the preparation of the sintered material minimum burning temperatures of 1700° C., at least 65% of the substances containing chromium oxide having a particle size greater than 0.12 mm. and under all circumstances the sintered material must have a silica content not exceeding 5.5%, and a lime:silica ratio not exceeding 0.6.

According to another known process for the manufacture of refractories from mixtures of magnesia and chromite, a mixture is prepared from chromite of a particle size greater than 0.5 to smaller than 4 mm., and a substance that furnishes magnesium oxide, such as sea water magnesia, of a particle size below 0.25 mm., e.g. at the ratio of chromite:magnesia=70:30 or 50:50, and this mixture is turned into briquettes which are then burnt at a temperature ranging from about 1300° C. to a maximum of 1500° C. The resulting sintered material is granulated, ground and then made into bricks which are burnt at a temperature not lower than 1500° C. (British Patent 873,765). Thus, in this process, the burning temperature used for sintering the material is at any rate so low that the bricks made from this sintered material are certainly not equivalent to bricks subjected to burning at a high temperature.

Furthermore, it has been proposed to manufacture refractories from mixtures of chromite of high silica content, e.g. chromite containing 31.52% of $SiO_2$, and magnesite or sintered magnesite and burnt in an oxidizing atmosphere at a minimum temperature of 1595° C., preferably at about 1680° C., if desired in briquetted form, whereupon the burnt product is made into bricks (French Patent 981,725 and British Patent 667,099). However, this process does not use a minimum temperature of 1700° C. for the preparation of the sintered material and the stated silica content of 20 to 40% is abnormally high.

According to another process, simultaneous burning is performed, using a mixture of magnesite or raw materials that furnish magnesia and material containing chromium oxide, the chromium oxide material present in the mixture being at least partially in the form of coarse lumps; after burning, a sintered product is obtained that consists predominantly of magnesia, with the mixture to be sintered being adjusted to a weight ratio of lime:silica=over 1.4:1, preferably 1.8:1, and the contents of lime and silica in the mixture are calculated so that the sum of these substances in the finished brick does not exceed 20%, whereupon the sintered material is granulated and worked up, if required or desired, in admixture with additives, especially substances containing chromium oxide, to form bricks or masses (Austrian Patent 189,113). In this process, the molecular ratio of lime:silica is adjusted to 1.5:1, preferably to 2:1 so that merwinite or dicalcium silicate forms.

There also may be mentioned a process in which synthetic magnesium hydroxide is mixed with chrome ore of a particle size below 0.074 mm. and the mixture is burnt at 1100° C. whereupon the resulting burnt product is ground to below 0.074 mm., briquetted and once more burnt at a temperature of 1700° C. (U.S. Patent 2,571,134). Thus, with this process, the preparation of the sintered material alone requires two burnings.

U.S. Patent 3,180,743 requires the use of a high purity, synthetic magnesia (at least 95% MgO), as from sea water, in forming co-sintered grains. The use of natural magnesite having an MgO content no more than 92%, in accordance with the present invention, has been found to provide markedly improved results. For example, in comparative tests, all conditions being equal except the nature (purity) of the magnesia, products made according to the present invention exhibit a substantially higher hot modulus of rupture than those prepared from highly pure magnesia (95+percent MgO).

The following examples illustrate the invention.

Example 1

A mixture of 23% of chromite (0–4 mm.), 67% of floated magnesite (0–0.2 mm.) containing 89–91% MgO, about 2.9% $SiO_2$, about 1.4 CaO and the balance Fe, Al, Mn, etc. (oxide analysis, dead-burned basis), 10% magnesite flue dust and 4% saturated kieserite solution was compacted into briquettes which were fired at about 1820° C.

The sintered material was comminuted and ground. 67% of this material having a particle size of 0.3 to 4 mm. and 28% having a particle size of 0 to 0.12 mm. were processed into bricks with an addition of 5% sintered magnesia that had been ground to a powder having a particle size below 0.10 mm., 1.5% dry sulfite cellulose waste liquor and 1.5% saturated kieserite solution. The bricks were dried at a temperature of 180° C. and had the following composition:

|  | Percent |
|---|---|
| $SiO_2$ | 3.3 |
| $Fe_2O_3$ | 8.7 |
| $Al_2O_3$ | 7.4 |
| $Cr_2O_3$ | 20.3 |
| CaO | 0.8 |
| MgO | 57.3 |
| Ignition loss | 2.2 |

In a comparison with unfired bricks which had virtually the same composition and were made in the usual manner from a mixture of chromite and sintered magnesia, and when fired in a tunnel kiln at about 1550° C., the bricks according to the invention exhibited much better values as to cold crushing strength, refractoriness under load, torsional strength and bursting. The results of the comparison test are set forth below. The numerical data in the left-hand column refer to the bricks according to the invention, and those in the right-hand column to the usual bricks.

| | | |
|---|---|---|
| Apparent specific gravity, grams per cubic centimeter | 3.00 | 3.01 |
| Apparent porosity, percent | 12.5 | 12.5 |
| Apparent porosity after firing in tunnel kiln, percent | 18.0 | 19.5 |
| Cold crushing strength, kilograms per square centimeter | 600 | 600 |
| Cold crushing strength after firing in tunnel kiln, kilograms per square centimeter | 550 | 290 |
| Thermal shock resistance, number of quenching cycles | (¹) | (¹) |
| Refractoriness under load after firing in tunnel kiln, $t_B$, °C | (²) | (³) |
| Torsional strength (twisting speed in degrees per hour) at— | | |
| 1,100° C | 0.02 | 0.08 |
| 1,200° C | 0.08 | 0.24 |
| 1,300° C | 0.30 | 0.69 |
| Bursting | 2.0 | 6.0 |

¹ More than 50.
² Above 1700 (100% of specimens).
³ Above 1700 (60% of specimens, 40% below 1700).

Example 2

The following mixture was used in producing the sintered material:

Raw magnesite (0–0.2 mm.) containing 88–90% MgO, about 2.9% $SiO_2$, about 1.8% CaO and balance Fe, Al, Mn, etc. (oxide analysis, dead-burned basis) _____percent__ 72
Chromite (0.10 to 3 mm.) _____do____ 12
Magnesite flue dust _____do____ 16
Saturated kieserite solution per 100 kilograms of the mixture _____liters__ 2

This mixture was compacted into briquettes, which were fired at 1750° C. The resulting sintered material may be grained and may be compacted into bricks, using the particle sizes stated in Example 1 and conventional binders. The bricks are ready for use after having been dried at 170° C. The sintered material may also be used in making ramming mixtures or other refractory masses or compositions. As has already been mentioned, it is necessary, particularly in the production of unfired bricks, to add up to 8% sintered magnesia in the form of a fine powder of 0–0.12 mm., if the sintered material contains more than 13% of $Cr_2O_3$, because the cold crushing strength of the bricks as supplied would not be satisfactory otherwise. This fine-grained sintered magnesia must not be added in excess of 8%, because this on the other hand would adversely affect the other favorable properties of the sintered material which are due to the fixing at high temperature.

Example 3

92% of the sintered material of Example 2 in a particle size of 0–0.2 mm. were mixed with 3% powdered waterglass and 5% clay (0–0.12 mm.). The resulting mixture may be shipped in a dry state and may be used as a spraying composition on the site. Depending on the type of spraying machine which is employed (Slurry or Torkret) the mixture is mixed with the required amount of water in a tank or directly in the spray nozzle and is sprayed.

Example 4

22% of chrome ore (particle size 0 to 4 mm.) were intimately mixed with 65% of the flotation magnesite of Example 1 (particle size 0 to 0.12 mm.) with addition of 13% of magnesite flue dust and 4% of saturated kieserite solution, and the mixture was formed into briquettes which were burnt for about 6 hours at 1720° C.

The sintered material was crushed and ground and 70% of this material of particle size 0.3 to 3 mm. and 30% of particle size 0 to 0.12 mm. were molded into bricks which were then burnt for about ten hours in a tunnel furnace at 1560° C. The bricks had the following composition and properties:

| | | |
|---|---|---|
| $SiO_2$ | percent | 3.81 |
| $Fe_2O_3$ | do | 9.27 |
| $Al_2O_3$ | do | 7.56 |
| $Cr_2O_3$ | do | 22.17 |
| CaO | do | 1.15 |
| MgO | do | 55.87 |
| Loss on ignition | do | 0.17 |
| Cold crushing strength | kg./cm.² | 570 |
| Flexural strength | kg./cm.² | 0.75 |
| Porosity | | 20.8 |
| Refractoriness-under-load: | | |
| $t_o$ | °C | 1600 |
| $t_a$ | °C | 1690 |
| Discontinued at 1700° C. ____percent drop__ | | 0.5 |
| Length shrinkage on being burnt at 1700° C. percent__ | | 0.50 |

Example 5

A sintered material was prepared under the conditions described in Example 4 from 15% of chrome ore and 71% of the flotation magnesite of Example 1 (for particle sizes, see Example 4) with addition of 14% of magnesite flue dust.

Bricks made from this sintered material by the method of Example 4 had the following composition and properties:

| | | |
|---|---|---|
| $SiO_2$ | percent | 2.62 |
| $Fe_2O_3$ | do | 8.50 |
| $Al_2O_3$ | do | 6.20 |
| $Cr_2O_3$ | do | 14.06 |
| CaO | do | 1.29 |
| MgO | do | 67.13 |
| Loss on ignition | do | 0.20 |
| Cold crushing strength | kg./cm.² | 620 |
| Flexural strength | kg./cm.² | 0.60 |
| Porosity | | 16.9 |
| Refractoriness-under-load: | | |
| $t_o$ | °C | 1530 |
| $t_a$ | °C | 1580 |
| Discontinued at 1700° C. ____percent drop__ | | 4.4 |
| Length shrinkage on being burnt at 1750° C. percent__ | | 0.45 |

Example 6

A sintered material was prepared as described in Example 5 but at a temperature of 1730° C.

Of this sintered material, there were used 70% of a particle size of 0.3 to 4 mm. and 30% of a particle size of 0 to 0.12 mm., admixed with 1.5% of dry sulphite cellulose waste liquor and 1.5% of water, and the mixture was shaped into bricks which were then dried at a temperature of 180° C.; they had the following composition and properties:

| | | |
|---|---|---|
| $SiO_2$ | percent | 2.62 |
| $Fe_2O_3$ | do | 8.50 |
| $Al_2O_3$ | do | 6.20 |
| $Cr_2O_3$ | do | 13.66 |
| CaO | do | 1.29 |
| MgO | do | 65.63 |
| Loss on ignition | do | 2.10 |
| Cold crushing strength | kg./cm.$^2$ | 622 |
| Porosity (after burning in tunnel furnace) | | 19.4 |
| Refractoriness-under-load, $t_o$ | ° C | 1580 |
| After burning in tunnel furnace, $t_a$ | ° C | 1640 |
| Discontinued at 1700° C. | percent drop | 2.0 |
| Length shrinkage on being burnt at 1750° C. | percent | 1.08 |

Example 7

22% of chromite of particle size 0 to 4 mm. and 65% of flotation magnesite of particle size 0 to 0.10 mm. were mixed, 13% of magnesite flue dust and 4% of saturated kieserite solution were added and the mixture was pressed in the form of briquettes which were then burnt at 1740° C.

The sintered material was ground and mixed with 40% of sintered magnesite of the following particle sizes:

| | Particle size, mm. |
|---|---|
| 35% sintered material | 2-4 |
| 25% sintered material | 0-0.12 |
| 35% sintered magnesite | 0.5-3 |
| 5% sintered magnesite | 0-0.12 |

2.5% of saturated kieserite solution was added and the whole made up into bricks which displayed the following composition and properties after having been dried at 180° C.:

| | | |
|---|---|---|
| $SiO_2$ | percent | 2.83 |
| $Fe_2O_3$ | do | 10.15 |
| $Al_2O_3$ | do | 3.69 |
| $Cr_2O_3$ | do | 11.46 |
| CaO | do | 1.10 |
| MgO | do | 69.82 |
| Loss on ignition | do | 0.95 |
| Cold crushing strength | kg./cm.$^2$ | 980 |
| Flexural strength | kg./cm.$^2$ | 0.60 |
| Porosity | | 18.1 |
| Refractoriness-under-load: | | |
| $t_o$ | ° C | 1505 |
| $t_a$ | ° C | 1650 |
| Discontinued at 1700° C. | percent drop | 0.9 |
| Length shrinkage on being burnt at 1750° C. | percent | 0.20 |

The above values for the flexural strength, porosity and refractoriness-under-load on firing were obtained after burning in a tunnel furnace at 1560° C.

Example 8

29% of chromite of particle size 0 to 4 mm. and 59% of flotation magnesite of particle size 0 to 0.10 mm. were mixed with 12% of magnesite flue dust and 4% of saturated kieserite solution, and the mixture was pressed to form briquettes which were then burnt at 1850° C.

Bricks, made from this sintered material as described in Example 4, displayed the following composition and properties:

| | | |
|---|---|---|
| $SiO_2$ | percent | 3.14 |
| $Fe_2O_3$ | do | 9.52 |
| $Al_2O_3$ | do | 6.72 |
| $Cr_2O_3$ | do | 23.94 |
| CaO | do | 0.62 |
| MgO | do | 55.91 |
| Loss on ignition | do | 0.15 |
| Cold crushing strength | kg./cm.$^2$ | 680 |
| Flexural strength | kg./cm.$^2$ | 1.12 |
| Porosity | | 17.4 |
| Refractoriness-under-load: | | |
| $t_o$ | ° C | 1570 |
| $t_a$ | ° C | 1680 |
| Discontinued at 1700° C. | percent drop | 0.8 |
| Length shrinkage on being burnt at 1750° C. | percent | 0.17 |

As will be seen from the foregoing examples, the process of this invention is also suitable for the manufacture of various types of refractory compositions from magnesia-chrome and chrome-magnesia. The granulated sintered material may be used in admixture with a bonding agent such as sulphite cellulose waste liquor and, if desired, sintered magnesia, whereupon the masses obtained display largely the same favorable properties as bricks molded from the sintered material. Therefore, the term "magnesia-chrome and chrome-magnesia refractory products" used in the present context includes also mixes or masses, such as tamping mixes, mortar, patching compositions and spraying compositions made from these substances.

What is claimed is:

1. A process for the manufacture of unburned refractory magnesia-chrome and chrome-magnesia bricks which comprises shaping a mixture of chrome ore having a particle size distributed in the range from 0 to at most 6 mm., and natural magnesite having an MgO content of no more than 92% and a particle size from 0 to at most 0.2 mm., sintering the shapes without fusion at a temperature of at least 1750° C., granulating the resulting sintered material in which substantially all of the periclase particles are directly bonded with the chromium oxide particles, and shaping the granulated material alone with a binder into bricks and drying said bricks, said sintered material containing 5 to 40% $Cr_2O_3$, having a lime:silica ratio of no more than 0.6 and a silica content of no more than 5.5%.

2. The process of claim 1 wherein the magnesite has an MgO content from about 83 to 92%.

3. The process of claim 1, wherein said sintered material has a lime:silica ratio of no more than 0.35 and a silica content of no more than 4.5%.

4. The process of claim 1, wherein the mixture is shaped into briquets for sintering.

5. The process of claim 1, wherein at least 65% of the chrome ore has a particle size over 0.12 mm.

6. The process of claim 5 wherein at least 80% of the chrome ore has a particle size over 0.12 mm.

7. The process of claim 1, wherein the natural magnesite has a particle size of 0 to at most 0.12 mm.

8. A process for the manufacture of burned refractory magnesia-chrome and chrome-magnesia bricks which comprises shaping a mixture of chrome ore, the particles of which have a size distributed in the range of from 0 to 6 mm., at least 65% of said particles being greater than 0.12 mm., and natural magnesite having an MgO content of no more than 92% and a particle size of from 0 to less than 0.12 mm., sintering said shapes at a temperature of at least 1700° C. without melting, granulating the resulting sintered material in which substantially all of the periclase particles are directly bonded with the chromium oxide particles, shaping the granulated material alone into bricks, and burning said bricks at temperatures of about 1500 to about 1600° C., said sintered material containing 5 to 40% $Cr_2O_3$, no more than 5.5% silica and having a lime:silica ratio of no more than 0.6.

9. The process of claim 8 wherein the magnesite has an MgO content of from about 83 to 92%.

10. The process of claim 8, wherein the chrome ore has a silica content of from 3 to 7%.

11. The process of claim 8, wherein the chrome ore consists of particles having a particle size distributed in the range of 0 to 4 mm.

12. The process of claim 8, wherein at least 80% of the particles of chrome ore have a particle size greater than 0.12 mm.

13. The process of claim 12, wherein the magnesite has a particle size of no more than 0.10 mm., and wherein the sintered material contains no more than 4.5% silica and has a lime:silica ratio of no more than 0.35.

14. The process of claim 8, wherein the magnesite provides a lime content in the sintered material of from 0.5 to 2.5%.

15. The process of claim 8, wherein the magnesite provides a lime content in the sintered material of from 0.8 to 1.5%.

16. The process of claim 8, wherein the magnesite is crude magnesite.

17. The process of claim 8, wherein said sintered material contains from 20 to 30% of $Cr_2O_3$.

18. A process for the manufacture of burned refractory magnesia-chrome and chrome-magnesia bricks which comprises shaping a mixture of chrome ore, having a particle size distributed in the range of from 0 to 6 mm., at least 65% of which has a particle size greater than 0.12 mm., and natural magnesite having an MgO content of no more than 92% and a particle size of 0 mm. to less than 0.12 mm., sintering said shapes at a temperature of at least 1700° C. without melting, granulating the resulting sintered material in which substantially all of the periclase particles are directly bonded with the chromium oxide particles, shaping the granulated material alone into bricks and burning said bricks at temperatures of about 1500 to about 1600° C.; said sintered material containing 5 to 40% $Cr_2O_3$, no more than 5.5% silica and having a lime:silica ratio of no more than 0.6, and of said granulated material shaped into bricks from 60 to 80% thereof having a particle size greater than 0.12 mm. and from 40 to 20% thereof having a particle size no greater than 0.12 mm.

19. The process of claim 18, wherein no more than 60% of the granulated material having a particle size no greater than 0.12 mm. have a particle size less than 0.66 mm.

20. A process for the manufacture of burned refractory magnesia-chrome and chrome-magnesia bricks which comprises shaping a mixture of chrome ore, having a particle size distributed in the range of from 0 to 6 mm., at least 65% of which has a particle size greater than 0.12 mm., and magnesite having an MgO content of no more than 92% and a particle size of 0 mm. to less than 0.12 mm., sintering said shapes at a temperature of at least 1700° C. without melting, granulating the resulting sintered material in which substantially all of the periclase particles are directly bonded with the chromium oxide particles, mixing sintered magnesia in an amount of less than 40%, with said granulated sintered material, no more than 10% of said sintered magnesia having a particle size less than 0.12 mm., shaping the resulting mixture into bricks and burning said bricks at temperatures of about 1500 to about 1600° C.; said granulated sintered material containing 5 to 40% $Cr_2O_3$, no more than 5.5% silica and having a lime:silica ratio of no more than 0.6, and of said granulated sintered material shaped into bricks from 60 to 80% thereof having a particle size greater than 0.12 mm. and from 40 to 20% thereof having a particle size no greater than 0.12 mm.

21. A process for the manufacture of unburned refractory magnesia-chrome and chrome-magnesia bricks which comprises shaping a mixture of chrome ore having a particle size distributed in the range of from 0 to at most 6 mm., and natural magnesite having an MgO content of no more than 92% and a particle size from 0 to at most 0.2 mm., sintering the shapes without fusion at a temperature of at least 1750° C.; granulating the resulting sintered material in which substantially all of the periclase particles are directly bonded with the chromium oxide particles; mixing, with said sintered and granulated material, sintered magnesia in an amount not over 35% with the proviso that, the sintered magnesia having a particle size not over 0.12 mm. is in an amount not over 8%; and shaping the mixture with a binder into bricks and drying said bricks said sintered material containing 5 to 40% of $Cr_2O_3$, having a lime:silica ratio of no more than 0.6 and a silica content of no more than 5.5%.

22. The process of claim 21, wherein said sintered magnesia having a particle size not over 0.12 mm. is mixed with said sintered and granulated material in an amount of from about 3 to about 5%.

23. The process of claim 21, wherein the sintered and granulated material contains at least 13% of $Cr_2O_3$.

24. The process of claim 22, wherein the sintered and granulated material contains at least 13% of $Cr_2O_3$.

References Cited

UNITED STATES PATENTS 3,180,743  4/1965  Davies et al. _____ 106—59

JAMES E. POER, *Primary Examiner.*

U.S. Cl. X.R.

106—66

UNITED STATES PATENT OFFICE
CERTIFICATE OF CORRECTION

Patent No. 3,429,723 February 25, 1969

Kurt Maria Maier et al.

It is certified that error appears in the above identified patent and that said Letters Patent are hereby corrected as shown below:

Column 2, line 46, "periclas" should read -- periclase --. Column 11, line 39, "0.66 mm." should read -- 0.06 mm. --.

Signed and sealed this 31st day of March 1970.

(SEAL)
Attest:

Edward M. Fletcher, Jr.
Attesting Officer

WILLIAM E. SCHUYLER, JR
Commissioner of Patents